United States Patent
Karadia

(10) Patent No.: US 11,858,304 B2
(45) Date of Patent: Jan. 2, 2024

(54) MULTI-MODAL VEHICLE

(71) Applicant: Narendra H. Karadia, Leicester (GB)

(72) Inventor: Narendra H. Karadia, Leicester (GB)

( * ) Notice: Subject to any disclaimer, the term of this patent is extended or adjusted under 35 U.S.C. 154(b) by 92 days.

(21) Appl. No.: 17/612,860

(22) PCT Filed: May 20, 2020

(86) PCT No.: PCT/GB2020/051232
§ 371 (c)(1),
(2) Date: Nov. 19, 2021

(87) PCT Pub. No.: WO2020/234591
PCT Pub. Date: Nov. 26, 2020

(65) Prior Publication Data
US 2022/0242182 A1    Aug. 4, 2022

(30) Foreign Application Priority Data

May 21, 2019 (GB) .................................. 1907167

(51) Int. Cl.
| | | |
|---|---|---|
| *B60F 5/02* | (2006.01) | |
| *B64C 1/00* | (2006.01) | |
| *B64C 3/56* | (2006.01) | |
| *B64C 37/00* | (2006.01) | |

(52) U.S. Cl.
CPC .............. *B60F 5/02* (2013.01); *B64C 1/0009* (2013.01); *B64C 3/56* (2013.01); *B64C 37/00* (2013.01)

(58) Field of Classification Search
CPC ................................... B60F 5/02; B64C 37/00
See application file for complete search history.

(56) References Cited

U.S. PATENT DOCUMENTS

| 1,794,796 | A | * | 3/1931 | Reichert | ................ B64C 25/50 |
| | | | | | 244/109 |
| 2,619,301 | A | | 11/1952 | Hall | |
| 5,836,541 | A | | 11/1998 | Pham | |
| 6,073,882 | A | | 6/2000 | Zieger | |
| 11,027,584 | B1 | * | 6/2021 | Kiceniuk, Jr. | ............ B64C 3/56 |
| 2007/0056291 | A1 | * | 3/2007 | Koenig | ................... F02C 3/085 |
| | | | | | 60/784 |

(Continued)

FOREIGN PATENT DOCUMENTS

| CN | 206344647 U | * | 7/2017 |
| DE | 3921171 A1 | | 1/1991 |

OTHER PUBLICATIONS

Search Report for United Kingdom Patent Application No. GB1907167.9 (dated Oct. 16, 2019).

(Continued)

*Primary Examiner* — Assres H Woldemaryam
*Assistant Examiner* — Anna L. Gordon
(74) *Attorney, Agent, or Firm* — Bond, Schoeneck & King PLLC; Joseph M. Noto

(57) ABSTRACT

The present invention relates to a multi-modal vehicle operable in a first mode as a fixed wing aircraft and reconfigurable to be operable in a second mode as a ground vehicle. The vehicle comprises first and second ends configured to operate in a first direction, with the first end leading the second end, in the first mode and in a second direction, with the second end leading the first end, in normal operation in the second mode.

16 Claims, 4 Drawing Sheets

(56) References Cited

U.S. PATENT DOCUMENTS

| | | | | |
|---|---|---|---|---|
| 2008/0251308 A1* | 10/2008 | Molnar | ................... | B64C 27/02 |
| | | | | 180/209 |
| 2010/0230532 A1 | 9/2010 | Curtis | | |
| 2015/0102155 A1* | 4/2015 | Krastev | ................... | B60L 50/16 |
| | | | | 244/2 |
| 2016/0288910 A1* | 10/2016 | Udriste | ................... | B60N 2/062 |
| 2016/0368339 A1 | 12/2016 | Nam | | |
| 2018/0056743 A1* | 3/2018 | Zhou | ...................... | B64D 17/80 |
| 2019/0256193 A1* | 8/2019 | Klein | ........................ | B60F 5/02 |
| 2020/0055358 A1* | 2/2020 | Stekelenburg | .......... | B64C 11/28 |

OTHER PUBLICATIONS

International Search Report for International Patent Application No. PCT/GB2020/051232.

* cited by examiner

MULTI-MODAL VEHICLE

This application is a 371 of International Patent Application Serial No. PCT/GB2020/051232, filed May 20, 2020, which claims of the benefit of Great Britain Patent Application Serial No. 1907167.9, filed May 21, 2019, all of which are hereby incorporated in their entirety.

The present invention relates to a multi-modal vehicle, particularly to a multi-modal vehicle operable in a first mode as an aircraft and a second mode as a ground vehicle.

The aerodynamic considerations when designing an aircraft compared to a car are significantly divergent. For example, aircraft are generally designed to provide an optimum amount of lift (i.e. an upwards force) and the cars are generally designed to avoid lift and provide an optimum amount of downforce (i.e. a downward force). Balancing these issues imposes significant burdens on the design considerations, and typically, a compromise must be made between generating lift and downforce, thus the vehicle may generate suboptimal lift in the flying mode and insufficient downforce in the driving mode.

Suboptimal lift generation may compromise the aerodynamic properties of the vehicle during flights and may lead to aerodynamic instability, high stall speeds and general poor performance. This increases the difficultly in controlling the vehicle and can lead to significant safety concerns. In order to overcome these issues, other parts of the vehicle need to be redesigned to compensate for the loss of lift, for example, by increasing the size of the lifting surface (e.g. wings) or the power of engine. This, in turn, increases the weight and complexity of the vehicle, thus further increasing the lift requirements. The increased size and weight of the vehicle can be cumbersome on the vehicle whilst driving, thus reducing the speed and acceleration of the vehicle due to the increased weight and drag. Furthermore, heavy components may increase the height of the centre of the gravity, thus giving the vehicle an inclination to roll whilst turning.

US2010/0230532 shows a prior art multi-modal vehicle, commonly referred to as a flying car. The flying car is configured to operate both as a fixed wing aircraft (as shown in FIG. 1) and as a ground vehicle (as shown in FIG. 2), for example, a car.

The vehicle has a pair of relatively large wings 11 that can be used to provide lift during flying. When driving, the wings 11 must be folded upwards to provide a more compact configuration, thereby allowing the car to use conventional roads etc.

The vehicle has a plurality of wheels 32 to support and propel the vehicle while driving, as well as during take-off and landing etc. The rear end of the vehicle has a propeller 13 to propel the vehicle in flight.

Conventional flying cars, as shown in US2010/0230532, have numerous problems, as will be outlined below.

The propeller is at the rear of the vehicle so that it does not interfere with operation of the vehicle as a car. This creates a 'pusher' aircraft configuration that is inherently less stable during flight.

Configuring the body of the vehicle to provide lift (e.g. such that both body and wings provide lift) may mitigate the issue of reduced lift, and thus help to reduce the size of wings or similar dedicated lifting surfaces. However, it is clear in this configuration, that downforce will be further reduced during driving due to the lift generated by the body (even when the wings are in the retracted state). This leads to greater instability when driving.

Insufficient downforce can compromise the aerodynamic properties of a vehicle whilst driving, and can lead to a loss of traction between the ground the vehicle. This increases the difficultly in controlling the vehicle and creates significant safety concerns. As such, the speed of the vehicle may need to be limited to around 30 mph (48 kmh). Additional spoilers or the like may be added to create additional downforce, however, such spoilers would increase drag and reduce lift during the flight, thus negatively affecting the flight characteristics of the vehicle.

It is an aim to ameliorate or overcome one or more of the above problems. It may be considered an additional or alternative aim to create a multimodal vehicle that offers improved aerodynamics when airborne and travelling on the ground.

According to a first aspect of the invention, there is provided: a multi-modal vehicle operable in a first mode as a fixed wing aircraft and reconfigurable to be operable in a second mode as a ground vehicle, the vehicle having first and second ends and being configured to operate in a first direction, with the first end leading the second end, in the first mode and in a second direction, with the second end leading the first end, in normal operation in the second mode.

According to a second aspect of the invention, there is provided: a method of operating a multi-modal vehicle operable in a first mode as a fixed wing aircraft and reconfigurable to be operable in a second mode as a ground vehicle, and the vehicle having first and second ends, comprising: operating the vehicle in a first direction, with the first end leading the second end, in the first mode and operating the vehicle in a second direction, with the second end leading the first end, in normal operation in the second mode.

According to a third aspect of the invention, there is provided a multi-modal vehicle operable in a first mode as a fixed wing aircraft and a second mode as a ground vehicle, the vehicle configured to operate in a first direction relative to the vehicle in the first mode and in a second direction relative to the vehicle in normal operation in the second mode, the first direction being different to the second direction.

Preferably, the first direction is substantially opposite to the second direction.

During take-off of, the vehicle described in US2010/0230532 will accelerate along a runway or the like using the vehicle propulsion system. The vehicle will roll/drive on the wheels 32 until the wings 11 generate enough lift for the aircraft to ascend. During the acceleration stage, the vehicle contacts the ground using all four wheels 32. The spacing of wheels 32 in both the transverse and longitudinal direction of the vehicle provides stability in the pitch, roll and yaw directions. As the vehicle lifts off, the wheels 32 no longer contact the ground and stability in the pitch, roll and yaw directions is instead provided by the wings 11 and other control/lifting surfaces.

However, the transfer of stability between the wheels and the wings 11 etc. is near instantaneous and therefore the operator has no 'feel' for how the aircraft is behaving in the flight mode when the wheels contact the ground. Therefore, there is a sharp boundary between the driving control regime and flight control regime. If control during the flight mode is unstable, for example, due to crosswinds or propeller torque, the operator will not be able detect this until the aircraft has left the ground and begins to behave unstably/erratically. For scenarios with severe flight instability and/or an inexperienced operator, this may cause the vehicle to operate outside safe flight parameters and/or may ultimately lead the vehicle to crash.

In order to ameliorate or overcome the above problem, according to a fourth aspect of the invention, there is provided: a multi-modal vehicle operable in a first mode as a fixed wing aircraft and reconfigurable to be operable in a second mode as a ground vehicle, wherein the vehicle comprises at least one retractable wheel configured to engage the ground in the second mode and to retract in an upward direction in the first mode, and an auxiliary wheel, the auxiliary wheel located proximal a first end of the vehicle, where during the first mode the retractable wheel is configured to retract in an upward direction such that the first end of the vehicle is supported by the auxiliary wheel.

The vehicle described in US2010/0230532 comprises tail/rear mounted propeller 13. As the vehicle is flying, air is split as it hits the front end of the body of the vehicle and the separate airstreams travel rearward along the vehicle body before passing though the propeller. As a result, the propeller blades pass through the flow boundary of each separate airstream as the propeller rotates. This causes the blades to vibrate, increasing both the noise generated and the risk of fatigue damage to the propeller and/or the vehicle.

Furthermore, the forward end of the vehicle rises during take-off, tipping the propeller toward the ground. In order to prevent the propeller from touching the ground, the propeller is mounted high up on the vehicle. This increases the height of the centre of mass of vehicle relative to the centre of lift, decreasing the roll stability of the aircraft both while driving and while flying.

In order to ameliorate or overcome the above problem, according to a fifth aspect of the invention, there is provided: a multi-modal vehicle operable in a first mode as a fixed wing aircraft and reconfigurable to be operable in a second mode as a ground vehicle, and the vehicle having first and second ends, comprising: operating the vehicle in a first direction, with the first end leading the second end the vehicle comprising a propulsion means configured to propel the vehicle in the first mode, the propulsion means located proximal a first end of the vehicle.

The vehicle described in US2010/0230532 comprises a rudder 42 to provide yaw control of the vehicle. The rudder 42 should is located behind the propeller 13 to provide effective control of the yaw direction. The 42 is mounted is mounted on a pylon 14 extending a significant distance behind the vehicle, thus increasing the length and decreasing the maneuverability of the vehicle.

Therefore in order to provide a rudder rearward of the propulsion means without increasing the length of the vehicle, according to a sixth aspect of the invention, there is provided: a multi-modal vehicle operable in a first mode as a fixed wing aircraft and reconfigurable to be operable in a second mode as a ground vehicle, comprising at least one wheel configured to engage the ground in the second mode, the wheel comprising a fairing configured to provide a rudder in the first mode.

Providing a suitable control system for operating a single vehicle when flying and when driving may also pose significant problems. One approach would be provide a yoke that may also be used as a steering wheel. However, since the yoke is configured to rotate and move in a forward/backwards direction, whereas the steering wheel is only configured to rotate, a locking mechanism is required to prevent forward/backwards movement of the yoke while driving.

Additionally, or alternatively, certain vehicle control functions may need to have similar actuators adjacent one another. For example, the rudder pedals for use during flight may be adjacent the brake/accelerators pedals for use when driving. The additional controls/actuators take up extra space within the cabin of the vehicle and/or may be undesirably small and/or close together, which may cause the operator to use the wrong pedal during operation of the vehicle, potentially resulting in loss of control etc.

Therefore, as an additional benefit of operating the vehicle in the first mode in a first direction and the operating the vehicle in the second mode in a second direction, according to a seventh aspect of the invention, there is provided a multi-modal vehicle operable in a first mode as a fixed wing aircraft and a second mode as a ground vehicle, where the vehicle comprises a first control system configured to allow an operator to control the vehicle in the first mode and a second, separate, control system configured to allow an operator to control the vehicle in the second mode, the first control system and the second control system are arranged in substantially opposing directions.

According to an eighth aspect of the invention, there is provided: a multi-modal vehicle operable in a first mode as a fixed wing aircraft and a second mode as a ground vehicle; and comprising an aerofoil rotatable about a longitudinal axis thereof. Preferably, the aerofoil is rotatable between a first position where aerofoil is configured to provide lift in the first mode and a second position where aerofoil is configured to provide downforce in the second mode. Preferably, the aerofoil provides an auxiliary/secondary aerofoil.

The vehicle may comprise a body shaped to provide lift when operating in the first direction and/or shaped to provide downforce when operating in the second direction.

The body may be substantially aerofoil shaped, the leading edge of the aerofoil provided at the first end of the vehicle and the trailing edge of the aerofoil provided at the second end of the vehicle.

The body may be angled such that the first end of the vehicle is raised with respect to the second end of the vehicle.

The vehicle may comprise a first control system configured to allow an operator to control the vehicle in the first mode and a second, separate, control system configured to allow an operator to control the vehicle in the second mode.

The first control system and the second control system may be arranged in substantially opposing directions.

The vehicle may comprise a seat movable between a first position/orientation to allow the user to operate the first control system and a second position/orientation to allow the user to operate the second control system.

The vehicle may comprise at least one retractable wheel configured to engage the ground in the second mode, the retractable wheel configured to retract in an upward direction.

The vehicle may comprise an auxiliary wheel, the auxiliary wheel located at a second end of the vehicle.

The auxiliary wheel may be located relatively higher than the retractable wheel in the second mode so as not to contact the ground and is configured to engage the ground during retraction of the retractable wheel.

One or more wheel may comprise a fairing, the fairing configured to act as a rudder in the first mode. The fairing may move/rotate in unison with the wheel. The rudder may be controllable by the steering system for the ground vehicle.

The vehicle may comprise one or more retractable wings configured to generate lift in the first mode.

The retractable wing may be retractable in a telescoping arrangement.

The vehicle may comprise a first auxiliary aerofoil located proximal the first end of the vehicle.

The vehicle may comprise a second auxiliary aerofoil located proximal the second end of the vehicle.

The first auxiliary aerofoil and/or the second auxiliary aerofoil may be rotatable about a longitudinal axis thereof.

The first auxiliary aerofoil and/or the second auxiliary aerofoil may be retractable.

The vehicle may comprise a propulsion means for propelling the vehicle in the first mode.

The propulsion means may be located proximal the first end of the vehicle.

The propulsion means may comprise a propeller.

One or more blades of the propeller may be retractable/removable.

The vehicle may be configured to take-off/land in a substantially vertical direction.

Wherever practicable, any of the essential or preferable features defined in relation to any one aspect of the invention may be applied to any further aspect. Accordingly, the invention may comprise various alternative configurations of the features defined above.

A practicable embodiment of the present will now be described with reference to the accompanying drawings, of which:

FIGS. 1-4 shows a multi-modal vehicle 2. The vehicle 2 is configured to operate in a first mode as a fixed wing aircraft and a second mode as a land vehicle (i.e. a flying car). The vehicle is reconfigurable to allow operation in the first mode and the second mode.

Figure 1:
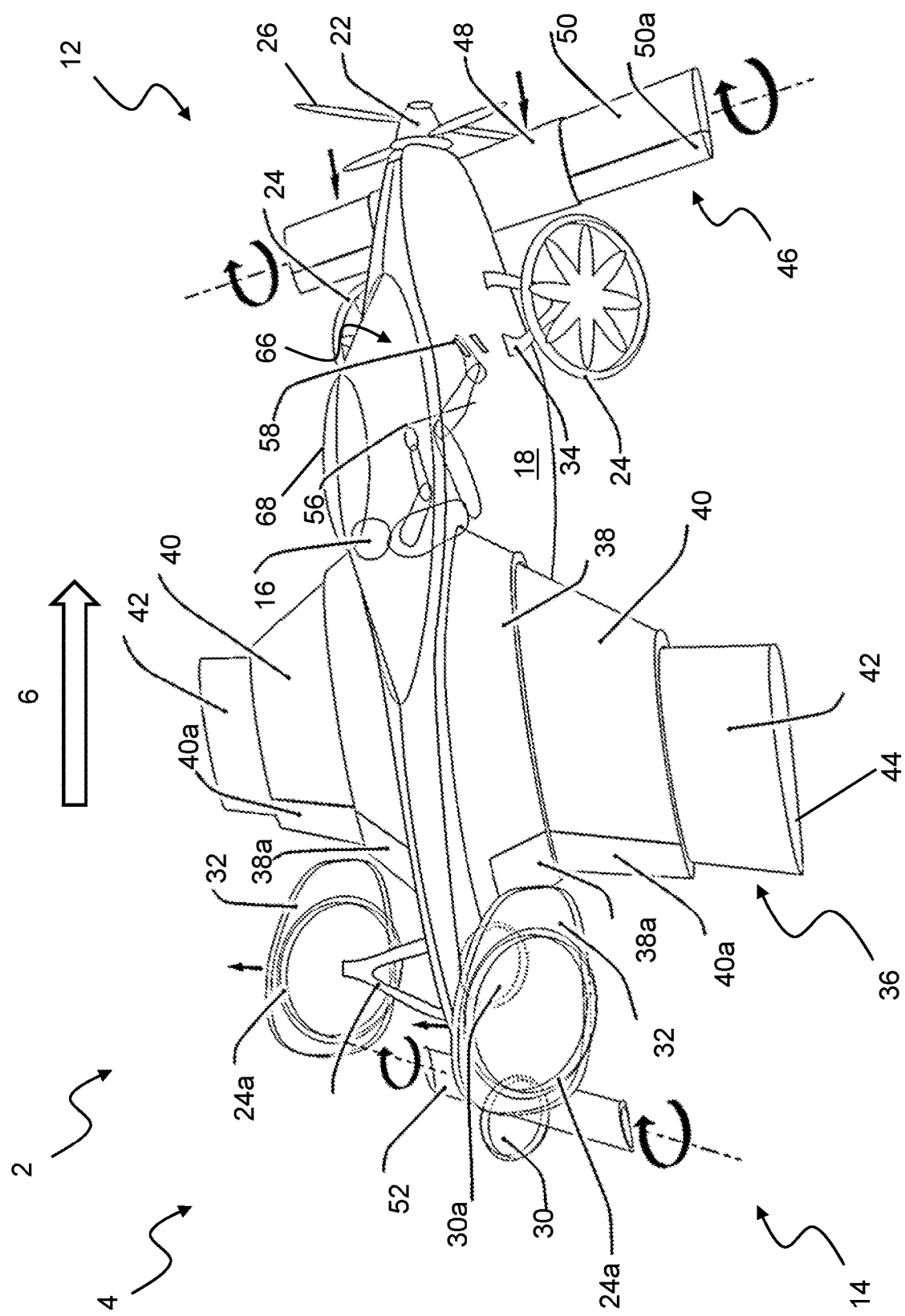
FIG. 1 shows a perspective view of multi-modal vehicle in an aircraft mode.
Figure 2:
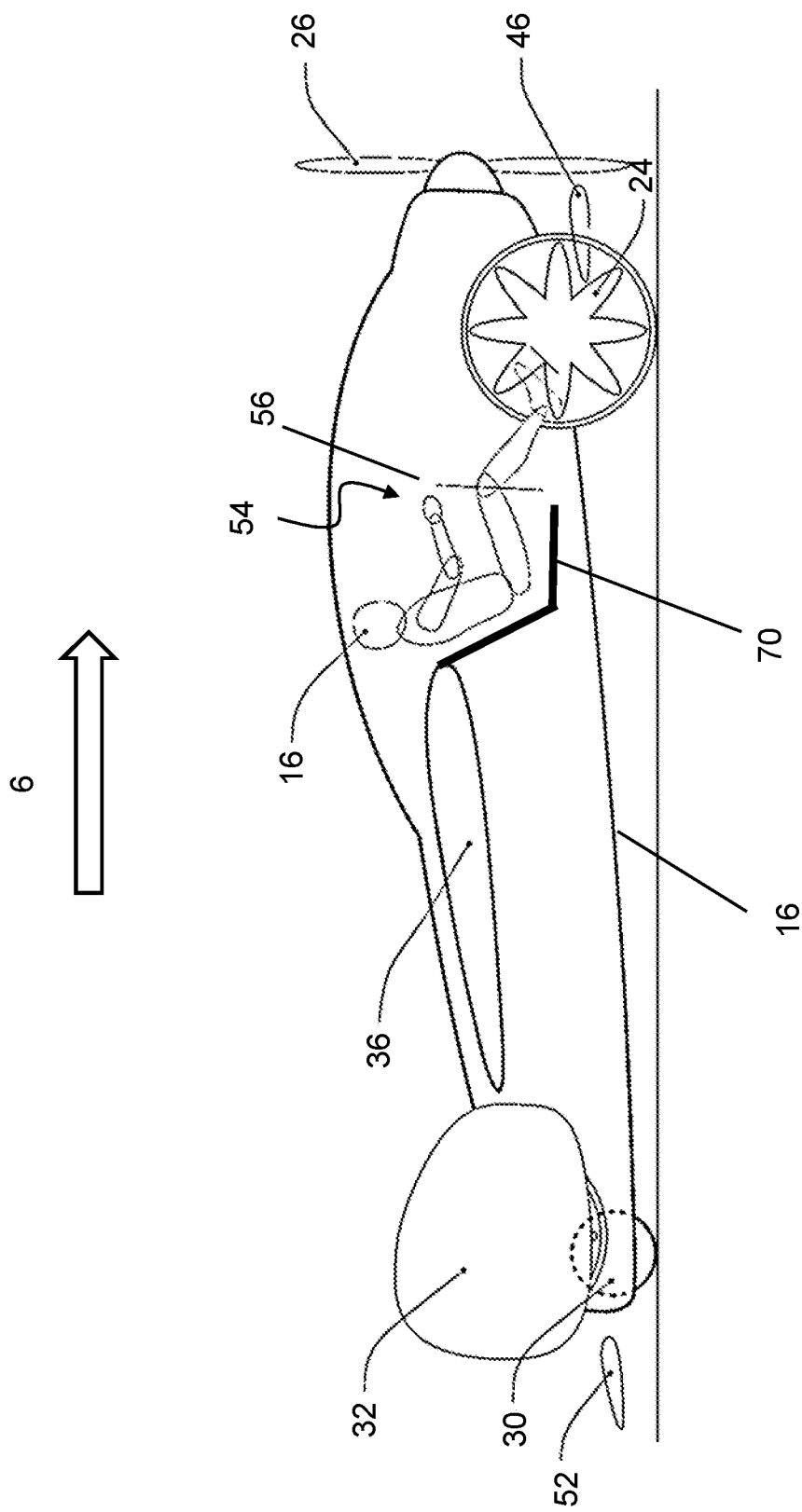
FIG. 2 shows a side section view of the multi-modal vehicle in an aircraft mode.

FIGS. 1 and 2 shows the vehicle 2 in the first mode (e.g. a flying mode), in which it is configured to operate as a fixed wing aircraft 4 (e.g. in a similar fashion to a conventional aeroplane). The vehicle 2 comprises one or more lift generating surfaces, which generate lift when the vehicle 2 travels a first direction 6, thereby permitting flight of the vehicle 2.

Figure 3:
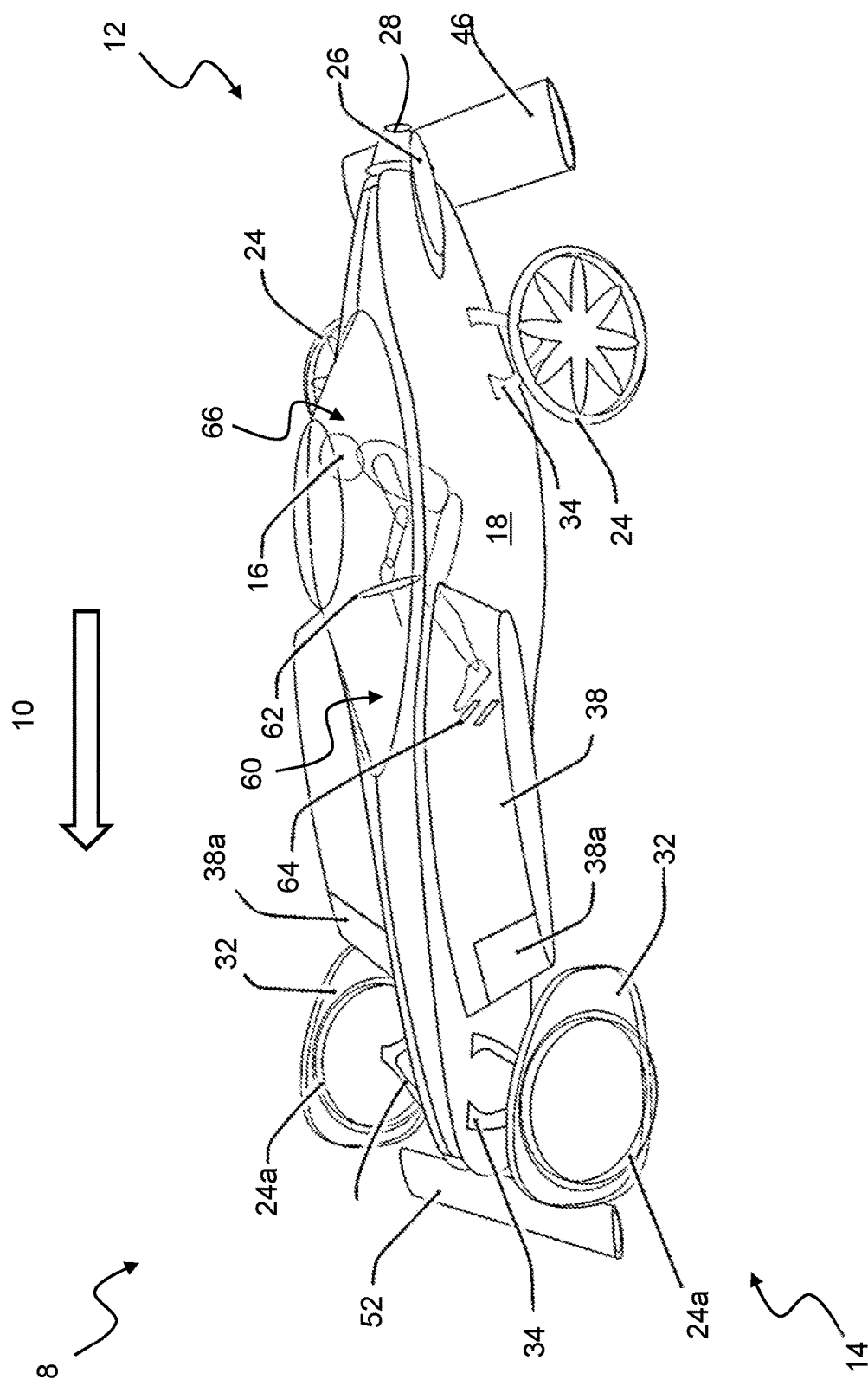
FIG. 3 shows a perspective view of multi-modal vehicle in a ground mode.
Figure 4:
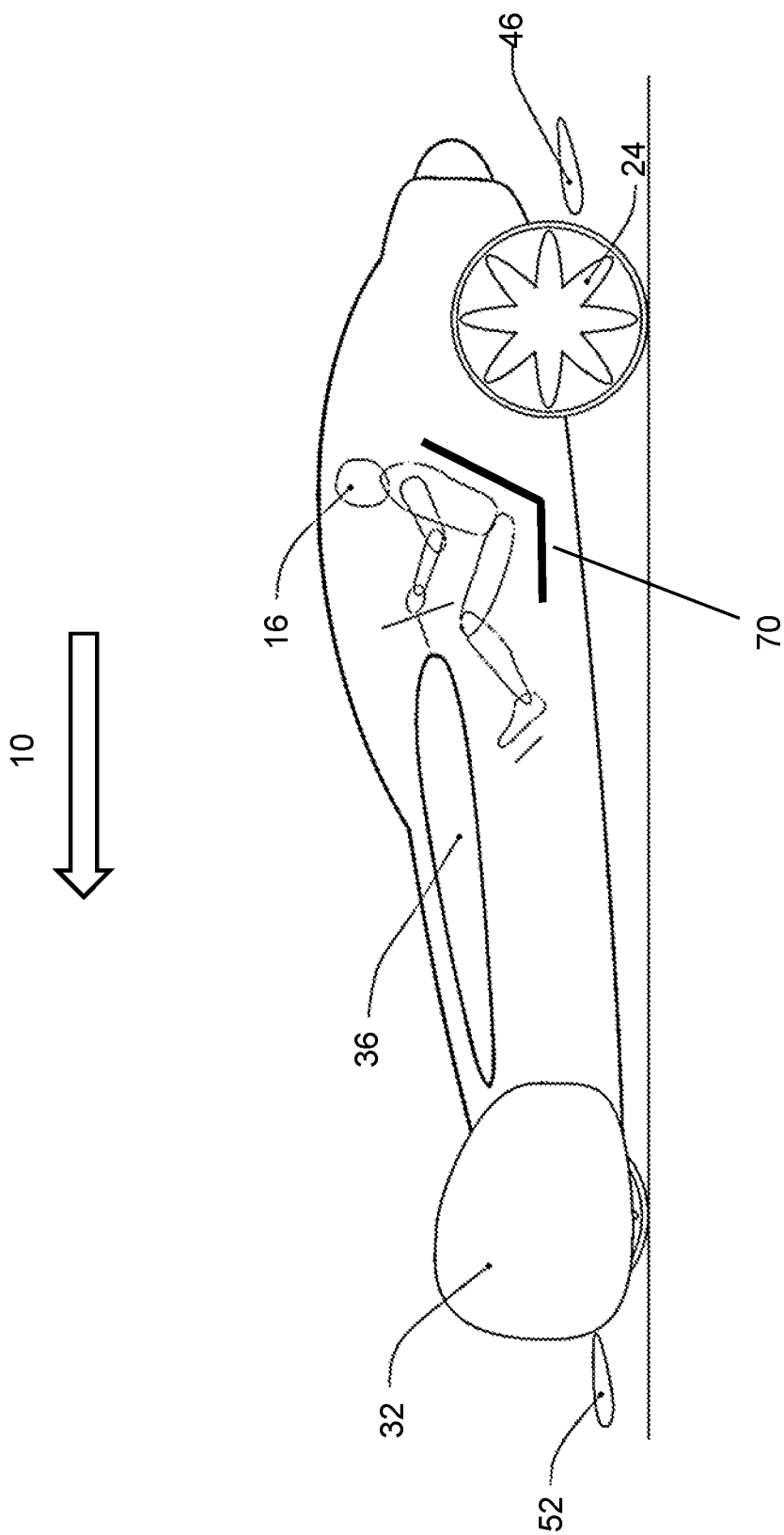
FIG. 4 shows a side section view of the multi-modal vehicle in a ground mode.

FIGS. 3 and 4 shows the vehicle 2 in the second mode (e.g. a driving mode), in which it is configured to operate as a ground vehicle 8 (e.g. in a similar fashion to a car etc.). The vehicle comprises one or more ground engaging features (e.g. wheels 24,24a) configured to drive the vehicle over the ground in a second direction 10.

The first direction 6 in which the vehicle operates in the flying mode is different to the second direction 10 in which the vehicle 2 travels in the driving mode (i.e. such that direction of the vehicle 2 during normal flight is in a different direction to the conventional driving direction). The first direction 6 may be substantially opposite to the second direction 10.

In an embodiment, the vehicle 2 comprises a first end 12 configured to face the direction of flight during the flying mode and a second end 14 configured face the direction of travel during the driving mode. Therefore, the first end 12 leads the second end 14 of the vehicle 2 during flight and the second 14 leads the first end 12 of the vehicle 2 during driving.

Whilst it is appreciated the vehicle 2 may have a reverse gear in the ground mode (i.e. the vehicle may be able to travel in the flying direction), normal operation of the vehicle 2 (e.g. a forward gear) is configured to operate in the direction substantially opposite to the flying direction. During operation of the vehicle 2, the operator 16 will face the first direction 6 when in the flying mode and will face the second direction 10 when in the driving mode.

Additionally, conventional features of ground vehicles (e.g. headlights, brake lights, indicators, wing mirrors) will also be arranged in an orientation/position that represents a ground vehicle facing the second direction 10, for example, the head lights will face the second direction 10 and tail/brake lights will face the first direction 6. Similarly, conventional features of aircraft (e.g. navigation lights, landing lights, ailerons, flaps) will be arranged in an orientation/position that represents an aircraft facing the first direction 6.

The vehicle 2 comprises a chassis (not shown). The chassis is configured to support and connect the various components of the vehicle, for example, a power plant, a transmission system, a control system, a battery, and electrical system, and/or other components of conventional aircraft or land vehicles.

The vehicle 2 comprises a body 18. The body 18 is configured to provide a housing for the chassis/internal components and/or an operator 16 of the vehicle 2.

In some embodiments, the body 18 comprises an aerodynamic surface shaped to provide a lift generating surface when the vehicle 2 is operating in the flying mode.

As shown in FIGS. 2 and 4, the body is substantially aerofoil shaped along a longitudinal axis thereof. For example, the body 18 may have a longitudinal cross-section comprising a teardrop shape. The leading edge of the aerofoil (e.g. the thicker end of the aerofoil) faces the first direction 6 and the trailing edge (i.e. the thinner end of the aerofoil) faces the second direction 10. Therefore, as the vehicle 2 travels in the first direction 6, airflow over the body 18 generates lift, and therefore contributes to the total lift generated in the flying mode.

Additionally, or alternatively, the body 18 is shaped to a provide downforce when the vehicle 2 is travelling in the second direction 10. For example, airflow over the aerofoil shape of the body 18 when travelling in the second direction 10 will generate a downwards force, thereby providing downforce.

The shape of the body 18 provides lift when travelling in the first direction 6 to aid flight of the vehicle 2 and/or downforce when travelling in the second direction 10 to provide greater traction to the wheels 24,24a against the ground. However, due to the effect of shape of the body 18 when travelling in opposing directions, little or no downforce is generated during flying and little or no lift is generated during driving. The vehicle 2 thereby provides improved/optimal aerodynamic properties in both the flying mode and the driving mode, without requiring a compromise in the aerodynamic properties in the flying or driving mode.

The body 18 may be angled/tilted in upward direction, such that the first end of the vehicle 2 is raised in an upward direction (e.g. increasing the angle of attack). This may increase the amount of lift and/or increase the amount of downforce generated by the body 18. Additionally, this raises the position of the operator 16 such that the view of operator 16 is not obscured by the vehicle, for example, this allows the operator 16 to more easily see over the second end 14 of the vehicle 2 whilst driving.

The aerodynamic properties of the body 18 may be optimised by selecting an appropriate angle of attack/incidence (i.e. the angle between the chord line of the aerofoil and the longitudinal axis of the vehicle). Additionally or alternatively, the aerodynamic properties of the body 18 may be optimised by selecting an appropriate shape/size of the body aerofoil.

The body 18 may be shaped in profile so as to define, for air passing over the body in the first direction, a low-pressure or suction surface (i.e. on its upper side) and a high-pressure surface (i.e. on its underside).

The shape of the body 18 may be configured to provide an optimum/peak performance (e.g. generate max lift or an optimum drag/lift ratio) in one or more flight condition, for example, a take off condition, a cruise condition or a landing condition. For example, the body 18 is configured to provide an optimum drag/lift ratio at specified airspeed during take-off/landing/cruise.

Additionally or alternatively, the body 18 is configured to provide an optimum/peak performance (e.g. generate max downforce or an optimum drag/downforce ratio for road use) in or more driving condition. For example, the body 18 is configured to provide the optimum drag/downforce ratio at a specified speed or speed range whilst diving.

The body 18 may comprise one or more lightweight materials. The body 18 may comprise fibre-reinforced composites, for example, carbon fibre reinforced composites. In other embodiments, the body 18 comprises a lightweight aluminium alloy.

The vehicle 2 comprises a propulsion means configured to propel the vehicle the in flying mode. The propulsion means may comprise a conventional aircraft propulsion means, for example, a propeller 22. In other embodiments, the vehicle 2 comprises one or more of: a contra-rotating propeller; a turbo-prop; turbo-jet; or a turbofan engine.

The vehicle 2 comprises a propulsion means configured to propel the vehicle 2 in the driving mode. The propulsion means may comprise a conventional vehicle engine, for example a petrol engine, a diesel engine, an electrical engine, or hybrids thereof. The propulsion means comprise one or more ground engaging features configured to apply traction to the ground, for example, a plurality of wheels 24,24a.

In an embodiment, the vehicle 2 comprises a single power plant to provide power for both the driving and flying propulsion means. The vehicle 2 may comprise a transmission system configured selectively transmit power from the engine to the driving propulsion means and the flying propulsion means (e.g. selectively transmit power between the wheels 24,24a and the propeller 22). Therefore, only a single engine is required to power the vehicle 2, thus reducing weight and saving on fuel requirements etc.

The flying mode propulsion means is provided proximal the first end 12 of the vehicle 2, thus providing a 'puller' type configuration. In an embodiment, the propulsion means comprises a propeller 22 at a first end 12 of the body 18. Such a configuration allows substantially unbroken airflow to flow into the propeller 22, thus reducing noise etc.

The propeller 22 comprises a plurality of blades 26 (e.g. aerofoils) to provide the propulsive force in use. As shown in FIG. 3, the blades 26 may be foldable and/or retractable such that the blades 26 can be moved from an extended configuration in which they form a propeller arrangement, to a second retracted position configured to reduce the size of the propeller 22. For example, in the retracted position the blades 26 may be configured to substantially lie flat against a rotor hub 28 and/or the body 18 of the vehicle 2.

In other embodiments, the blades 26 are removable/detachable, for example, such that the operator 16 can remove the blades 26 and stow them elsewhere on the vehicle 2.

The vehicle 2 comprises a plurality of wheels 24,24a configured to engage the ground when in the land mode and during take-off/landing of the vehicle 2 in the flying mode. The vehicle 2 may comprise four wheels 24,24a arranged in a typical car like arrangement, (e.g. two wheels 24 at the first end 12 and two wheels 24a at the second end 14).

In the illustrated embodiment, one or more wheels 24a at the second end 14 of vehicle 2, are moveable in an upward direction from an extend position (see FIGS. 3 and 4) to a retracted position (see FIGS. 1 and 2). The movable, or retractable, wheels 24a allow the first end 12 of the vehicle to be lower than the second end 14 of the vehicle 2, thus allowing the vehicle 2 to operate in a 'tail dragger' configuration. This may increase the angle of attack of lift generating surfaces (i.e. the body 18, wings 26 etc.) in the flying mode, thus generating more lift during take-off and landing.

The wheels 24,24a may be attached to the vehicle 2 via a suspension member 34 to provide mechanical damping of the one or more wheel 24,24a. The suspension member 34 may comprise a double/single 'wishbone' type configuration. The suspension member may be movable/pivotable to permit one or more the retractable wheels 24a to move to the retracted position.

The illustrated vehicle 2 also comprises an auxiliary wheel 30 located at central portion of the body 18 proximal the second end 14. The auxiliary wheel 30 is located at a higher position on the vehicle body 18 relative to the wheels 24, such that the auxiliary wheel 30 does not contact the ground when the retractable wheels 24a are in the extended position. However, when the retractable wheels 24a are moved upwards into the retracted position, the auxiliary wheel 30 contacts the ground. The retractable wheels 24a may then be moved further upwards, so that they do not contact the ground and the second end 14 of the vehicle 2 is supported by the auxiliary wheel 30 alone.

The auxiliary wheel 30 may be retractable. For example, the auxiliary wheel 30 may be movable in a longitudinal direction to a retracted position 30a (FIG. 1) substantially contained with the vehicle body 18.

In other embodiments the auxiliary wheel 30, perhaps in an extended state, is located at the same height as the retractable wheels 24a in their extended position, such that the auxiliary wheel 30 and the wheels 24,24a engage the ground concurrently. The auxiliary wheel 30 may then be withdrawn from engagement with the ground by moving to the retracted position 30a.

The auxiliary wheel 30 may be rotatable about a substantially vertical axis, for example, to provide a 'castor' type wheel.

The auxiliary wheel 30 and retractable wheel 24a arrangement allows increased/free roll of the second end 14 of the vehicle 2 during take off. Therefore, the operator 16 has a feel for the aerodynamic forces over the lifting surfaces as the vehicle takes off, before the wheels 24 and/or auxiliary wheel 30 leave the ground.

In other embodiments, the retractable wheel(s) 24a and the auxiliary wheel 30 (if present) are located at the first end 12 of the vehicle 2, thus allowing the vehicle 2 to operate in a 'tricycle' configuration. In this embodiment, the auxiliary wheel 30 may be in retracted state during the driving mode and then may extend downwards in the flight mode (e.g. during take-off) so that the body 18 of the vehicle 2 remains substantially level. The auxiliary wheel 30 may then retracted during flight.

One of the more of the wheels 24,24a may comprise a fairing 32. The fairing 32 is configured to cover or surround at least a portion of the wheel and thereby reduce aerodynamic drag during flying/driving. For example, the fairing 32 may substantially cover the entire wheel, leaving only a small portion of the wheel 24, 24a extending from beneath the fairing. The fairing 32 may be aerodynamically shaped (e.g. substantially wedge or teardrop shaped), with the thinner, leading edge of the fairing 32 facing the first direction 6.

One or more the wheels 24,24a may be rotatable about a vertical axis in the flying mode (i.e. as in conventional ground vehicles), allowing rotation of the fairing 32 Therefore, the fairing 32 may guide air flowing past the vehicle 2 and act as a rudder during the flying mode. The steering system of the ground vehicle thus provides the rudder system of the aircraft. The position of the fairing 32 is fixed relative to the wheels 24,24a. The fairing 32 thus rotates in unison with the wheel 24,24a.

In an embodiment, the retractable wheels 24a proximal the second end 14 of the vehicle 2 each comprise a fairing 32. Thus the fairings 32 and/or retractable wheels 24a acts as a rudder at a rearward end of the aircraft 4.

The vehicle 2 comprises one or more aerofoils configured to provide lift during the flying mode. The one or more aerofoils may additionally provide downforce to the vehicle during the driving mode.

The vehicle 2 comprises one or more aerofoils configured to act as a conventional wing 36 during the flying mode. The leading edge of the wing 36 is directed toward the first end 12 of the vehicle, thereby generating lift when the vehicle 2 travels in the first direction 6. In an embodiment, the vehicle 2 comprises a wing 36 located each side of a central portion thereof (i.e. such that the centre of lift is proximal the centre of mass).

The wing 36 may be shaped such that the surface of the wing 36 is substantially continuous with the surface of the body 18 (i.e. the joint between the wing 36 and the body 18 forms a curve with a large radius of curvature), to form a 'blended wing body' aircraft (i.e. there is no distinct boundary between the wing 36 and the body 18).

In some embodiments, the body 18 may comprise a partial wing extending from a side thereof (not shown). The partial wing may extend from the first end 12 of the vehicle 2 toward the second end 14, tapering in the transverse direction toward the first end 12. The wing 36 is blended into the partial wing, such that partial wing and the wing 36 provide a continuous lifting surface.

The wing 36 is retractable. This allows the wings of the vehicle 2 to be retracted during the driving mode and/or storage. This decreases the operational footprint of the vehicle 2 during driving and, and thereby reduces the probability of collisions etc, as well as increasing the roll stability of the vehicle 2.

In an embodiment, the wing 36 is arranged in a telescoping arrangement. The wing 36 comprises a first wing portion 38 which is connected to the body 18 of vehicle and may be integrally formed therewith. The first wing portion 38 may comprise one or more control surface 38a (e.g. aileron) to allow control of the aircraft during the flying mode. The first wing portion 38 may be 'blended' with the body 18 of the vehicle 2.

The first wing portion 38 may telescopically receive a second wing portion 40. The second wing portion 40 may comprise one or more ailerons 40a.

The second wing portion 40 may telescopically receive a third wing portion 42. The third wing portion 42 may comprise one or more ailerons.

The first wing portion 38 and the second wing portion 40 may be substantially hollow in order to telescopically receive connected wing portions. Thus, in the retracted state, the second wing portion 40 and the third wing portion 42 are substantially contained within the first wing portion 38. A portion of the second and third wing portions 40,42 may be contained with the body 18 (i.e. the first wing portion 38 is shorter than the second/third wing portion) to allow the first wing portion 38 to have a reduced transverse length.

It is appreciated that any number of telescopic wing portions may be provided in order to reach a desired length of wing, whilst still maintaining a reduced footprint.

The wing 36 may comprise an actuator to move the wing 36 between the retracted and the extended position. This may allow automatic/semi-automatic extension/retracted of the wing 36. In other embodiments, the wing 36 is manually extendable/retractable.

The wings 36 may comprise a locking means to prevent relative movement between the first/second/third wing portions, thereby securing the wing 36 in the extended or retracted position.

The outermost end of the wing 36 (e.g. the outermost end of the third wing portion 42) may comprise a wingtip device 44. The wing tip device 44 is configured to prevent vortices generating at the wing tip during flight, thus reducing drag. The wing tip device 44 may further protect the end of the wing 36 from damage and/or may act to cap the end of the first wing portion 38 when the wing 36 is retracted, preventing water etc. entering the body during the driving mode.

In an embodiment, the wingtip device 44 comprises a 'wingtip fence'. The wingtip fence comprises a substantially vertical plate extending above and below the plane of the wing 36.

In other embodiments, the wing 36 may comprise one or more other conventional wingtip devices 44, for example: a winglet; a sharklet; a canted winglet; a split tip; or a raked wingtip.

The vehicle 2 may comprise one more auxiliary aerofoil. The auxiliary aerofoil may be distal from the wings and is configured to provide lift and/or control of the vehicle from other locations thereof. The auxiliary aerofoil may help distribute the lifting force about the vehicle 2 and/or bring the centre of lift proximal/into alignment with the centre of mass, thereby providing greater aerodynamic stability.

In the illustrated embodiment, a first auxiliary aerofoil 46 is provided proximal the first end 12 of the vehicle. The first auxiliary aerofoil 46 is configured to extend transversely to the axis of the vehicle. As shown in FIG. 2, first auxiliary aerofoil 46 is spaced from a lower surface of the body 18, and offset from the first end 12 and the propeller, such that there is no contact therebetween.

The first auxiliary aerofoil 46 may be retractable, thereby allowing for a more compact configuration during the driving mode and/or storage. The first auxiliary aerofoil 46 comprises a first member 48 affixed to the vehicle. A second member 50 is telescoping received within the first member 48. The first member 48 and/or the second member 50 may comprise one or more control surface 50a (e.g. ailerons) at a rearward edge thereof. As illustrated, only the second member 50 comprises a control surface 50a, such that when the aerofoil 46 is in a retracted state, the control surface 50a is contained within the first member 48, thereby protecting the control surface 50a from damage.

In the illustrated embodiment, a second auxiliary aerofoil 52 is also proximal the second end 14 of the vehicle 2. The second auxiliary aerofoil 52 is configured to extend transversely to the axis of the vehicle. As shown in FIG. 4, second auxiliary aerofoil 52 is offset from the body 18 toward the second direction 10.

In some embodiments, the second auxiliary aerofoil 52 is retractable (e.g. in a telescoping arrangement as in the first auxiliary aerofoil 46). The second auxiliary aerofoil 52 may comprise one or more control surfaces.

In an embodiment, a third auxiliary aerofoil (not shown) is provided on an underside of the body 18. The third auxiliary aerofoil may be located toward the second end 14 of the vehicle 2, adjacent the second auxiliary aerofoil 52. The third auxiliary aerofoil may comprise a forward-swept/reverse-delta (e.g. straight leading edge, receding trailing edge) shaped wing. The third auxiliary aerofoil may comprises an wing-tip device and/or control surface.

The auxiliary aerofoil(s) 46,52 are rotatable about the transverse axis. The auxiliary aerofoil(s) 46,52 may be rotatable between a first position where they are configured to generate lift and a second position where they are configured to generate downforce. For example, as shown in FIGS. 1 and 2, the auxiliary aerofoils 46,52 are in a first position where the leading edge of each aerofoil 46,52 is facing generally the first direction 6, thereby generating lift during the flying mode. The first and second aerofoils 46,52 may act as auxiliary wings and/or control surfaces in the flying mode.

As shown in FIGS. 3 and 4, auxiliary aerofoils 46,52 have been rotated substantially 180 degrees so that the leading edge of the aerofoil is facing generally the second direction 10, generating an aerodynamic force in a downward direction (e.g. downforce) in the driving mode. It should be understood that the change in angle of attack resulting from rotating the auxiliary aerofoils 46,52 by 180 degrees, and/or an asymmetric shape of the aerofoils, will provide the change from lift to downforce despite the leading edge being the same in both configurations described. The first auxiliary aerofoil 46 may provide a rear spoiler and the second aerofoil 52 may provide a front spoiler in the driving mode. Additionally or alternatively, the first and second aerofoils 46,52 may provide a rear and front bumper respectively.

The auxiliary aerofoil(s) may comprise an actuator configured to provide rotation of the aerofoil(s). In other embodiments, the auxiliary aerofoil(s) are mounted via a bearing or like and may be manually rotated into the position. The auxiliary aerofoil(s) may have a locking mechanism configured to lock the auxiliary aerofoil(s) at a desirable angle.

One or both of the auxiliary aerofoils 46,52 may rotate to an angle during the flying or driving mode to generate or adjust lift/downforce/drag as required. For example, at least one of the auxiliary aerofoils 46,52 may rotate to increase angle of attack (i.e. to a more vertical direction) to increase the drag and/or lift during take-off or landing, thereby acting as 'flaps'. In other examples, one or more auxiliary aerofoils 46,52 may rotate to provide or increase a negative angle of attack to create more downforce for the vehicle 2 while driving (e.g. when cornering).

The vehicle 2 may have a controller configured to determine the correct rotational position of the auxiliary aerofoil(s) 46,52 depending on the mode of operation and/or flight/driving conditions. For example, the controller may be configured to rotate one or more auxiliary aerofoils 46,52 into the correct position when a flight mode, driving mode, take-off mode or landing mode is selected by the operator 16. In other examples, the controller may detect the vehicle 2 being driven at a given threshold speed/angular velocity, and rotate one or more auxiliary aerofoils 46,52 to increase the downforce.

In other embodiments, the angle of one or more auxiliary aerofoils 46,52 may be adjusted manually (either by hand or the actuator) to adjust the aerodynamic properties of the vehicle 2. For example, the operator may adjust the angle of one or more auxiliary aerofoils 46,52 to allow 'trim' of the lift generating configuration (e.g. fine adjustment of the pitch orientation).

One or more of the auxiliary aerofoils 46,52 may be mounted eccentrically, such that the act of rotating an aerofoil 46,52 also changes its longitudinal position relative to the body 18 of the vehicle 2. For example, shown in FIGS. 1 and 2, the first auxiliary aerofoil 46 is offset from the propeller 22 so as not to interfere with the propeller blades 26. However, as shown in FIGS. 3 and 4, when the first auxiliary aerofoil 46 is rotated, it extends past a point where the propeller blades 26 would be located (when not retracted).

As shown in FIGS. 1 and 2, the vehicle 2 comprises a first set of controls 54 configured to control the vehicle in the flying mode. The first set of controls 54 comprise conventional aircraft control systems and/or indicators. As illustrated, aa control wheel/yoke 56 and rudder pedals 58 are provided. The first set of controls 54 may also include other standard controls and instruments for aircraft such as radar display, altitude indicator, attitude indicator, throttle levers, airspeed indicators etc.

The first set of controls 54 are arranged such that the operator 16 is substantially facing the direction of normal operation during flight (i.e. toward the first end 12 of the aircraft and the first direction 6).

As shown in FIGS. 3 and 4, the vehicle 2 also comprises a second set of controls 60 configured to control the vehicle 2 in the driving mode. The second set of controls 60 comprise conventional ground vehicle (e.g. a car) control systems including a steering wheel 62 and brake/accelerator/clutch pedals 64. Again, other standard controls and instruments for road vehicles, for example a gearstick, speedometer; indicator levers etc can be provided as part of the second set 60 of controls. The second set of controls 60 are arranged such that the operator 16 is substantially facing the direction of normal operation during driving (i.e. toward the forward end 12 of the ground vehicle and the second direction 10).

As such, the first set of controls 54 and the second set of controls 60 are configured to face different directions (e.g. opposing directions).

The first set of controls 54 and the second set of controls 60 can respectively be considered a flying control system 54 and a driving control system 60. Both control systems 54,60 may be operatively linked, such that a single component of the vehicle can be controlled by a particular control from either control system 54,60. For example, a yoke 56 in the flying control system 54 and a steering wheel 62 in the driving control system 60 could both be configured to control the retractable wheels 24a, to allow rudder control whilst flying and to allow turning whilst driving respectively. It is appreciated that other features of the control systems 54,60 may be linked, thereby providing a degree of redundancy in the event of the failure of one or more controls of either control system 54,60.

The separate control systems 54,60 for the flying mode and the driving mode allow separate controls to be used for each mode, thereby reducing the risk of using the incorrect control etc. This also allows each control system 54,60 to be specialised for the driving mode and the flying mode respectively.

The control systems 54,60 are located in a cabin or cockpit 66. The cockpit 66 may provide a substantially enclosed environment for the operator 16 to operate the vehicle 2 and the protect the operator 16 from the external environment. The cockpit 66 may comprise a door or the like to allow the operator 16 to enter the vehicle 2. The body 18 may comprise a portion of increased transverse width to accommodate the cockpit 66.

The cockpit 66 comprises a canopy 68 configured to protect the operator 16 from wind, weather and debris etc. The canopy 68 is substantially transparent and therefore acts as a windscreen/windshield. The canopy 68 may be dome like, thereby offering a substantially 360 degree field of view and allowing the operator 16 to see out of the vehicle 2 when facing different directions whilst operating the vehicle 2 in the flying mode and the driving mode respectively. In other embodiments, only select portions of the canopy 68 are transparent. For example, an upper portion of the canopy 68 may be opaque and/or discrete windscreens may be provided for operation in the flying and driving modes respectively.

The canopy 68 is aerodynamically shaped in order to reduce drag. The canopy 68 may comprise an ovoid or tear drop like shape. The shape/surface of the canopy 68 may be blended with the shape/surface of the body 18 (i.e. to provide a substantially continuous surface), in order to reduce drag at the interface between the body 18 and the canopy 68. The canopy 68 may form part of the leading edge of the aerofoil shaped body 18 (e.g. the canopy 68 provides additional height to increase the 'thickness' of the aerofoil).

The canopy 68 may be openable/removable to allow the operator to enter/exit the vehicle. The canopy 68 may comprise openable portions, for example, windows or ventilation openings.

The cockpit 66 comprises a seat 70 or the like configured to support the operator 16 during operation of the vehicle 2. The seat 70 comprises conventional apparatus used in vehicle/aircraft seats, for example, seat belts, posture adjustment means, heaters etc.

The seat 70 is movable between a first position where the operator can use the aircraft controls 54 and a second position in which the operator can use the driving controls 60. The seat 70 may rotatable, for example, so that the user can simply rotate within the chair. Additionally, or alternatively, the seat 70 is moveable so that the operator can adjust the position of the seat 70 relative to the controls (e.g. for correct arm/leg distance to steering wheel/pedals).

In other embodiments, a plurality of seats 70 may be provided, with each of the seat configured to position the operator in front of the respective controls.

Further seats or the like may be provided for passengers. The further seats may be rotatable/movable, such that the passengers can face the direction of travel as required.

It will be appreciated the vehicle comprises other conventional features of ground vehicles and/or aircraft, as required by statute or regulation in various states or via international agreements.

In the present embodiment, the ground vehicle comprises a car, however, it can be appreciated this is merely exemplary and the vehicle may comprise any suitable ground vehicle, for example: a van; a lorry; a motorcycle; a bus; a minibus; a military vehicle etc. The ground vehicle may therefore comprise any number of wheels or axles in accordance with the type of vehicle.

Operation of the Invention

The operation of the invention will now be described according to the embodiments in FIGS. 1-4.

The vehicle 2 may begin a journey in a first mode as a ground vehicle 8 (e.g. a car), as shown in FIGS. 3 and 4.

The wings 36 are in a retracted state, and the auxiliary aerofoils 46, 52 are in a retracted state and arranged with the leading edge facing the second direction 10, thus generating downforce. All four of the wheels 24,24a engage the ground, and the auxiliary wheel 30 is in a retracted state 30a within the body. The propeller blades 26 are stored in a retracted configuration.

The operator 16 will drive the vehicle to a first location, for example, a suitable location for taking off the vehicle in the flying mode. The vehicle 2 is driven in the second direction 10 with the operator 16 facing said direction. The vehicle 2 may be turned using the wheels 24a at the second end 14 thereof. Operation of the ground vehicle is otherwise conventional and will not be described further.

Once the vehicle 2 has reached the intended take off location, the vehicle 2 will be reconfigured to operate as a fixed wing aircraft 4.

As shown in FIGS. 1 and 2, the wings 36 will be moved outward into the extended position. The auxiliary aerofoils 46,52 are rotated by substantially 180 degrees, such that the leading edges faces the first direction 6. The auxiliary wheel 30 is moved into the extended position 30 outside of the body, and the retractable wheels 24a are moved in an upwards direction, such that the second end 14 of the vehicle rests on the auxiliary wheel 30. The second end 14 of the vehicle may be lowered, depending on the configuration of the retractable wheels 24a/auxiliary wheel 30. The propeller blades 26 are moved to the extended position to define a propeller 22.

The operator will then move to face to first direction 6 (e.g. via the movable seat) in order operate the fixed wing aircraft 4.

The vehicle 2 may then take off. Control of the yaw is provided by the wheel fairings 32 provided on the retractable wheels 24a on the second end 14 of the vehicle 2. Control of the pitch and roll is provided by the ailerons 40a on the wings 36 and/or auxiliary wings 46, 52. The vehicle 2 will otherwise operate as a conventional fixed wing aircraft.

Once landed, the vehicle 2 can be reconfigured by the driving mode, for further driving and/or storage.

In an embodiment, the vehicle may take-off/land in a vertical take-off and landing (VTOL) configuration. The vehicle 2 may comprise a jack pivotally mounted to an underside thereof. The jack may then pivot beneath the vehicle and engage the ground to raise the first end 12 of the vehicle upward into an angled/vertical position. A plurality of legs (e.g. four) pivotably attached to the vehicle may then rotate into engagement with ground to support the vehicle 2. The jack is then retracted, leaving the legs to support the vehicle. The vehicle 2 would then take off in an angled/vertical direction, and once airborne, the legs would be retracted (e.g. to lie flat against the vehicle). In order to land, the process will be substantially reversed.

The invention claimed is:

1. A multi-modal vehicle operable in a first mode as a fixed wing aircraft and reconfigurable to be operable in a second mode as a ground vehicle, the vehicle having first and second ends and being configured to operate in a first direction in the first mode, with the first end leading the second end, and in a second direction, opposite the first direction, in the second mode, with the second end leading the first end, in normal operation the multi-modal vehicle comprising at least one retractable wheel configured to engage the ground in the second mode and an auxiliary wheel, the auxiliary wheel located at the second end of the vehicle, wherein the retractable wheel is configured to retract in an upward direction such that the auxiliary wheel is located relatively higher than the retractable wheel in the second mode so as not to contact the ground and is configured to engage the ground during retraction of the retractable wheel.

2. The multi-modal vehicle according to claim 1, comprising a body, the body comprising an aerodynamic surface shaped to provide lift when operating in the first direction and/or shaped to provide downforce when operating in the second direction.

3. The multi-modal vehicle according to claim 2, wherein the body is substantially aerofoil shaped along a longitudinal axis thereof, the leading edge of the aerofoil provided at the first end of the vehicle and the trailing edge of the aerofoil provided at the second end of the vehicle.

4. The multi-modal vehicle according to claim 2, wherein the body is angled such that the first end of the vehicle is raised with respect to the second end of the vehicle.

5. The multi-modal vehicle according to claim 1, wherein the vehicle comprises a first control system configured to allow an operator to control the vehicle in the first mode and a second, separate, control system configured to allow the operator to control the vehicle in the second mode.

6. The multi-modal vehicle according to claim 5, wherein the first control system and the second control system are arranged in substantially opposing directions, the first control system being arranged such that the operator is facing the first direction and the second control system being arranged such that the operator is facing the second direction.

7. The multi-modal vehicle according to claim 5, comprising a seat, the seat movable between a first position/orientation to allow the operator to operate the first control system and a second position/orientation to allow the user to operate the second control system.

8. The multi-modal vehicle according to claim 1, wherein one or more wheel comprises a fairing, the fairing configured to act as a rudder in the first mode.

9. The multi-modal vehicle according to claim 1, comprising one or more wings configured to generate lift in the first mode, wherein the one or more wings are retractable in a telescoping arrangement.

10. The multi-modal vehicle according to claim 1, comprising an auxiliary aerofoil located proximal the first end of the vehicle and/or a second auxiliary aerofoil located proximal the second end of the vehicle.

11. The multi-modal vehicle according to claim 10, wherein the first auxiliary aerofoil and/or the second auxiliary aerofoil is rotatable about a longitudinal axis thereof.

12. The multi-modal vehicle according to claim 10, wherein the first auxiliary aerofoil and/or the second auxiliary aerofoil are retractable.

13. The multi-modal vehicle according to claim 1, comprising a propeller for propelling the vehicle in the first mode.

14. The multi-modal vehicle according to claim 13, wherein the propeller is located proximal the first end of the vehicle.

15. The multi-modal vehicle according to claim 13, wherein one or more blades of the propeller are retractable/removable.

16. A method of operating a multi-modal vehicle according to claim 1, comprising:
  operating the vehicle in a first direction, with the first end leading the second end, in the first mode and operating the vehicle in a second direction, with the second end leading the first end, in normal operation in the second mode.

* * * * *